United States Patent [19] [11] 4,306,982
Bloom [45] Dec. 22, 1981

[54] METHOD OF INCREASING POROSITY AND PERMEABILITY OF SUBSURFACE ROCK FORMATIONS TO INCREASE EFFICIENCY OF SECONDARY HYDROCARBON RECOVERY OPERATIONS

[76] Inventor: Stanley H. Bloom, 6747 Hillwood La., Dallas, Tex. 75240

[21] Appl. No.: 140,611

[22] Filed: Apr. 15, 1980

Related U.S. Application Data

[63] Continuation-in-part of Ser. No. 914,890, Jun. 12, 1978, abandoned.

[51] Int. Cl.$^3$ .............................................. E21B 43/22
[52] U.S. Cl. ............................... 252/8.55 D; 166/275
[58] Field of Search .................. 252/8.55 D; 166/272, 166/273, 274, 275

[56] References Cited

U.S. PATENT DOCUMENTS

| 1,658,305 | 2/1928 | Russell | 166/273 |
| 3,085,063 | 4/1963 | Turbak | 252/8.55 X |
| 3,087,539 | 4/1963 | Maurer | 252/8.55 X |
| 3,207,217 | 9/1965 | Woertz | 166/273 |
| 3,227,210 | 1/1966 | Trantham | 166/273 X |
| 3,884,831 | 5/1975 | Bloom | 75/103 X |
| 4,110,224 | 8/1978 | Allen | 252/8.55 |

Primary Examiner—Herbert B. Guynn
Attorney, Agent, or Firm—Leydig, Voit, Osann, Mayer & Holt, Ltd.

[57] ABSTRACT

The permeability and porosity of subsurface rock formations are enhanced by injecting a fluid into the formation together with carbon dioxide, an ammonium ion source, and a catalyst system that includes a free chloride ion source, a free nitrate ion source, and an anionic hydrophile dissolved in a polar solvent.

12 Claims, No Drawings

4,306,982

METHOD OF INCREASING POROSITY AND PERMEABILITY OF SUBSURFACE ROCK FORMATIONS TO INCREASE EFFICIENCY OF SECONDARY HYDROCARBON RECOVERY OPERATIONS

RELATED APPLICATIONS

This application is a continuation-in-part of Ser. No. 914,890, filed June 12, 1978 now abandoned.

BACKGROUND OF THE INVENTION

The present invention relates generally to fluid-flood secondary recovery operations for extracting oil and gas from subsurface rock formations, and more particularly to a method of increasing the efficiency of such operations by increasing permeability and porosity of the rock.

Secondary hydrocarbon recovery, and it should be understood that this term is meant to include what is sometimes referred to as "tertiary" recovery, is of extreme importance. Without it, only a small fraction of all hydrocarbons proven to be present in subsurface formations would be recoverable. Secondary recovery can increase the amount recovered to between 40 and 50% of the oil-in-place.

In water and other fluid-flood methods of secondary recovery, a fluid is injected under pressure into a reservoir through an injection well. This fluid displaces the hydrocarbons, forcing them to migrate toward producing wells. Formation brine is one of the commonly used sources for the displacing fluid. Other sources include fresh water from ponds, lakes, streams, rivers, and subsurface formations, and salt water from subsurface formations and the ocean. The choice is governed by such factors as availability and compatibility of the water with the formation to be flooded.

The injection rate and pressure to be used in a given fluid-flood operation are selected to provide an economic operation while avoiding excessive high pressure that might induce detrimental fractures in the formation. The efficiency of a flood project is dependent upon many factors, such as the relative permeability of the producing formation to oil, gas, and displacing fluid, the porosity of the formation, the viscosities of the various fluids, and the irreducible residual hydrocarbon saturation.

The particular grains of a rock are usually held together by a cementing material such as calcite, dolomite, quartz, iron oxide, anhydrite, and various others. The porosity, i.e.—the voids within which the hydrocarbons are found, and the permeability, i.e.—the extent to which such voids are interconnected thus permitting the hydrocarbons to migrate, as, for example, toward a producing well, are largely determined by the grain size, the degree of compaction of the mineral grains, and the extent of their cementation.

A vast majority of the oil and gas bearing rock strata are of sedimentary character, that is they comprise sandstones, shales, or limestones, or combinations thereof. In turn, the most important building blocks of such rock types are the silicate and carbonate minerals. Oxides, sulfides, and sulfates are found in the rock matrices less frequently. Among the cations most commonly associated with these compounds are the metals of Groups I and II, such as, for example, aluminum and iron.

SUMMARY OF THE INVENTION

A primary object and aim of this invention is to provide a method of increasing the efficiency of fluid-flood type secondary recovery. A related object is to provide a method of increasing the permeability and porosity of flooded hydrocarbon bearing formations.

Another object is to provide such a method that will reduce the residual hydrocarbon saturation of the producing formation.

A more specific object is to provide such a method that includes use of a catalyst system to enhance solubilization of various metal ions contained in the producing formation. A related object is to provide such a method that uses a generally non-corrosive, non-toxic, biodegradable, and nonpolluting catalyst.

Other objects and advantages will become apparent upon reading the following detailed description. The invention is susceptible to various modifications and alternative forms. While specific embodiments thereof will be described in detail herein, it should be understood that it is not intended to limit the invention to the particular forms disclosed, but, on the contrary, the intention is to cover all modifications, equivalents, and alternatives falling within the spirit and scope of the invention as expressed in the appended claims. Thus, while the present invention will be described in connection with a water-flood, it should be understood that the system is equally applicable to any fluid flood system in which the catalyst is chemically compatible with the displacing fluid.

DETAILED DESCRIPTION OF THE INVENTION

In accordance with the present invention, there is added to a displacing fluid for use in a fluid-flood secondary recovery operation the following:

(1) carbon dioxide gas;

(2) an ammonium ion source, preferably ammonia gas; and (3) a catalyst system that includes a free chloride ion source, a free nitrate ion source, an anionic hydrophile, and optionally a non-ionic hydrophile, dissolved in a polar solvent.

It is believed that the addition of this system to a displacing fluid greatly enhances dissolution and removal of aluminum ions, Group I metal cations, Group II metal cations, and, to some extent, iron cations from the rock lattice. Accordingly, the porosity and permeability of a reservoir flooded with a displacing fluid treated in accordance with the present invention is greatly increased.

Carbon dioxide gas is injected under pressure with the displacing fluid. The amount of carbon dioxide injected should be in the range of from about 0.01 to about 30 moles per liter of fluid.

The ammonium ion source, which is preferably ammonia gas, but which may be soluble ammonium compounds such as $NH_4OH$, is injected with the fluid in an amount such that from 1 to 4 moles of carbon dioxide are injected for each mole of ammonium ion source.

It is essential that the pH of the fluid be maintained in the range 7.3 to 8.7, perferrably 7.3 to 8.3. The pH can be adjusted upward by using a ratio of carbon dioxide to ammonium ion source at the lower end of the range, and can be adjusted downward by using a ratio at the higher end of the range. If such adjustment is not sufficient to bring the pH of the fluid within the 7.3 to 8.7 range, it is necessary to add additional ingredients to effect the pH adjustment. For example, acetic acid could be used to lower the pH.

THE CATALYST SYSTEM COMPONENT

In my U.S. application Ser. No. 333,321, now U.S. Pat. No. 3,884,831, I described a catalyst system and a method for improving the leaching of elements such as copper from their ores using the catalyst system. The catalyst system used in the present invention includes a free chloride ion source, a free nitrate ion source, and an anionic hydrophile dissolved in a polar solvent. The catalyst system should be premixed, as equivalent results may not be obtained if the components of the system are added individually to the displacement fluid.

The free chloride and nitrate ions provided by the catalyst system are believed to greatly enhance the solubilizing effect provided by the carbon dioxide and ammonium ion sources in the displacing fluid. The mechanism by which this improvement is obtained is not fully understood; however, it is theorized that the free chloride and nitrate ions aid in transporting solubilized metal cations into the bulk of the displacing fluid.

The chloride ion source may be any material containing a chloride ion, so long as it will provide a free chloride ion in the environment of the displacing fluid. Representative examples of suitable materials include ammonium chloride, hydrogen chloride, lithium chloride, potassium chloride, and sodium chloride. The catalyst system should contain from about 0.01 to 10, preferably 0.25 to 1 moles of chloride ions per liter.

Similarly, any nitrate compound may be employed as the source of free nitrate ions so long as the source provides free nitrate ions in the displacing fluid environment and is soluble therein. Among the materials which are suitable are the following representative examples: ammonium nitrate, nitric acid, lithium nitrate, potassium nitrate and sodium nitrate. The catalyst system should contain from about 0.01 to 10, preferably 0.25 to 1 moles of nitrate ions per liter. The relative amounts of chloride and nitrate ions should be such that the mole ratio of chloride ions to nitrate ions is in the range from $\frac{1}{3}$ to 1/0.5.

The anionic hydrophile may be virtually any such hydrophile, so long as the hydrophile is soluble in the polar solvent and in the displacing fluid. Any of the following types may be used: soaps, sulfated soaps, sulfated amides, sulfated alcohols, sulfated ethers, sulfated carboxylic acids pertroleum sulfonates, sulfonated aromatic hydrocarbons, sulfonated aliphatic hydrocarbons sulfonated aromatic-aliphatic hydrocarbons, sulfonated amides, sulfonated ethers, acylated amino acids, acylated polypeptides and metal alkyl phosphates. Representative examples include sodium dodecylatedoxydibenzene disulfonate, sodium lauryl sulphate, sodium N-alkylcarboxy sulfosuccinate, sodium alkylsulfosuccinate, polyalkanolaminefatty acid condensate, sodium alkylbiphenyl sulfonate, sodium alkyl-naphthalene sulfonate and sodium dodecylbenzene sulfonate. The anionic hydrophile serves to lower the surface tension of the displacing fluid at the rock fluid interface which increases the exposure of the rock to the fluid so as to increase the rate of dissolution of metal ions. Also, and perhaps more importantly, the hydrophile acts as a complexingtransporting agent for the solubilized metal ions. The concentration of anionic hydrophile in the catalyst system should be at least about $1 \times 10^{-4}$ moles per liter and preferably $1 \times 10^{-3}$ moles per liter. The concentrations should not exceed that at which the cloud point is reached.

A small amount of a non-ionic hydrophile may optionally be employed to improve wetting of the rock with the displacing fluid by decreasing the surface tension and also to assist in creating a more favorable environment for the dissolution of the mineral complexes into the displacing fluid. Any non-ionic hydrophile that is capable of exhibiting such characteristics, so long as the material is soluble in both the catalyst solvent and the displacing fluid, could be used. Typical type of suitable hydrophiles include esters of polyhydric alcohols, alkoxylated amides, esters of polyoxyalkylene glycols, ethers of polyoxyethylene glycols, alkylolamide-fatty acid condensates, tertiary acetylenic glycols and dialkylpolyoxyalkylene phosphates. It is preferred to employ a non-ionic ethanol hydrophile having a molecular weight from about 78 to about 250 or higher. Other specific examples include alkyl aryl polyoxyethylene ether and polyoxyethylene alkyl thiether.

The nitrate ion source, chloride ion source, anionic hydrophile, and, if desired, the non-ionic hydrophile are all dissolved in a polar solvent to provide a solution that is added to the displacing fluid before or during injection.

On the basis of availability and economy, it is preferred to employ water as the polar solvent for the catalyst system. However, it should be appreciated that other solvents could be used so long as the source of nitrate ions and chloride ions is soluble therein.

One gallon of the catalyst system is added to every 100 to 10,000 barrels of displacing fluid.

EXAMPLE

A 55 gallon batch of catalyst is prepared by mixing 15 pounds of ammonium chloride, 15 pounds of ammonium nitrate, 8 fluid ounces of a 50 wt.% solution in water of sodium dodecylated oxydibenzene disulfonate (having a distribution mean gram molecular weight of 756.96), and 0.25 pound of alkylphenoxyl poly (ethylene oxy) ethanol (having a gram molecular weight of 436.6) with sufficient water to make 55 gallons. The catalyst is added to a displacing fluid, assumed, for purposes of this example, to be an alkaline formation of brine, at a ratio of about one gallon per 10,000 barrels of displacing fluid. The displacing fluid is injected into a hydrocarbon bearing reservoir. Carbon dioxide gas and ammonia gas are injected into the reservoir simultaneously with the displacing fluid.

The catalyzed water flood system of the present invention provides a powerful, yet discrete, leaching environment to enhance dissolution and transport of metal cations from the sedementary sandstones, clays, shales, and rock of the flooded reservoir. The resulting continuous increase in pore size and permeability of the reservoir permits use of lower input pressures for the displacing fluid, which reduces the energy requirements of the pumping equipment and reduces risk of structural channelling in the rock formation. The catalyzed water flood is recyclable, as it separates from oil with ease and a minimum if any emulsification. More complete recovery of hydrocarbons is made not merely technically possible, but also economically feasible.

I claim:

1. In a method of flooding a subsurface rock formation with an aqueous fluid to displace hydrocarbons resident in said formation toward a producing well, the improvement whereby the ability of said fluid to increase the permeability of said formation is enhanced, comprising: maintaining the pH of said fluid in the range 7.3 to 8.7 while adding to said fluid
   (a) carbon dioxide gas under pressure in an amount from 0.01 to 30 moles per liter of said fluid;
   (b) an ammonium ion source in an amount such that one mole is added for each 1 to 4 moles of carbon dioxide added; and
   (c) a catalyst system including in a polar solvent, a free chloride ion source in a concentration of from about 0.01 to about 10 moles per liter, a free nitrate ion source in a concentration of from about 0.01 to about 10 moles per liter, the mole ratio of said chloride ions to said nitrate ions being within the range $\frac{1}{3}$ to 1/0.5, and an anionic hydrophile which reduces the surface tension of the displacing fluid in a concentration of at least about $1 \times 10^{-4}$ moles per liter, said anionic hydrophile being soluble in the displacing fluid and the polar solvent, one gallon of said system being added to every 100 to 10,000 barrels of said fluid.

2. The method of claim 1 in which said catalyst system further includes a non-ionic hydrophile which is soluble both in the polar solvent and the displacing fluid and which reduces the surface tension of the displacing fluid.

3. The method of claim 1 in which the chloride ions and nitrate ions are both present in the catalyst system in a concentration in the range 0.25 to 1 mole per liter.

4. The method of claim 1 in which the concentration of anionic hydrophile in the catalyst system is at least about $1 \times 10^{-3}$ moles/liter.

5. The method of claim 1 in which the ammonium ion source is ammonia gas.

6. The method of claim 5 in which the anionic hydrophile of the catalyst system is sodium dodecylated oxydibenzene disulfonate.

7. The method of claim 6 in which the concentration of sodium dodecylated oxydibenzene disulfonate in the catalyst system is at least about $1 \times 10^{-3}$ moles/liter.

8. The method of claim 5 in which the chloride ions and nitrate ions are both present in the catalyst system in the range of 0.25 to 1 moles/liter.

9. The method of claim 5 in which the pH of the fluid is maintained below about 8.3.

10. The method of claim 1 in which the pH of the fluid is maintained below about 8.3.

11. In a method of flooding a subsurface rock formation with an aqueous fluid to displace hydrocarbons resident in said formation toward a producing well, the improvement whereby the ability of said fluid to increase the permeability of said formation is enhanced, comprising: maintaining the pH of said fluid in the range 7.3 to 8.7 while adding to said fluid
   (a) carbon dioxide gas under pressure in an amount from 0.01 to 30 moles per liter of said fluid;
   (b) an ammonium ion source in an amount such that one mole is added for each 1 to 4 moles of carbon dioxide added, said ammonium ion source being selected from the group consisting of ammonia, ammonium hydroxide, ammonium chloride, and ammonium nitrate, and
   (c) a catalyst system including in a polar solvent a free chloride ion source in a concentration of from about 0.01 to about 10 moles per liter, said chloride ion source being selected from the group consisting of ammonium chloride, hydrogen chloride, lithium chloride, potassium chloride, and sodium chloride, a free nitrate ion source in a concentration of from about 0.01 to about 10 moles per liter, said nitrate ion source being selected from the group consisting of ammonium nitrate, nitric acid, lithium nitrate, potassium nitrate and sodium nitrate, the mole ratio of said chloride ions to said nitrate ions being within the range $\frac{1}{3}$ to 1/0.5, and an anionic hydrophile which reduces the surface tension of the displacing fluid in a concentration of at least about $1 \times 10^{-4}$ moles per liter, said anionic hydrophile being soluble in the displacing fluid and the polar solvent, one gallon of said system being added to every 100 to 10,000 barrels of said fluid.

12. The method of claim 11 in which the polar solvent is water.

* * * * *